US012476041B2

(12) United States Patent
Yoshioka et al.

(10) Patent No.: US 12,476,041 B2
(45) Date of Patent: Nov. 18, 2025

(54) INDUCTOR COMPONENT AND MOUNTING STRUCTURE OF INDUCTOR COMPONENT

(71) Applicant: Murata Manufacturing Co., Ltd., Kyoto-fu (JP)

(72) Inventors: Yoshimasa Yoshioka, Nagaokakyo (JP); Kouji Yamauchi, Nagaokakyo (JP); Katsufumi Sasaki, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 735 days.

(21) Appl. No.: 17/811,825

(22) Filed: Jul. 11, 2022

(65) Prior Publication Data

US 2023/0014349 A1 Jan. 19, 2023

(30) Foreign Application Priority Data

Jul. 13, 2021 (JP) ................................ 2021-115688

(51) Int. Cl.
*H01F 27/29* (2006.01)
*H01F 27/28* (2006.01)
*H01F 37/00* (2006.01)

(52) U.S. Cl.
CPC ....... *H01F 27/292* (2013.01); *H01F 27/2828* (2013.01); *H01F 37/005* (2013.01)

(58) Field of Classification Search
CPC ... H01F 27/292; H01F 27/2828; H01F 37/005
See application file for complete search history.

(56) References Cited

U.S. PATENT DOCUMENTS 5,572,180 A * 11/1996 Huang ................ H01F 17/0013 336/200
6,147,573 A * 11/2000 Kumagai ............. H03H 7/0115 336/200
6,713,162 B2 * 3/2004 Takaya ..................... H03H 7/09 428/209
12,094,631 B2 * 9/2024 Cheng ................... H01F 41/042
(Continued)

FOREIGN PATENT DOCUMENTS

JP H08-055726 A 2/1996
JP H09-148136 A 6/1997
(Continued)

*Primary Examiner* — Malcolm Barnes
(74) *Attorney, Agent, or Firm* — Studebaker Brackett PLLC

(57) ABSTRACT

An inductor component includes an element body, a coil on the body and spirally wound along an axis, first and second external electrodes electrically connected to the coil, and first and second through wirings which penetrate a substrate of the element body between main surfaces. The first coil wirings and through wirings, and the second coil wirings and through wirings, are connected as follows. With respect to two of the first through wirings adjacent to each other in a direction of the axis, on the first main surface, a relationship between a radius of an equivalent circle diameter of an end surface of each of the first through wirings and a minimum distance between end surfaces of the two first through wirings is satisfied, and with respect to two of the second through wirings adjacent to each other in the direction of the axis, a similar relationship is satisfied.

20 Claims, 11 Drawing Sheets

(56) References Cited

U.S. PATENT DOCUMENTS

| | | | | |
|---|---|---|---|---|
| 2017/0278624 | A1* | 9/2017 | Ogino | H01F 27/32 |
| 2017/0345558 | A1* | 11/2017 | Sekiguchi | H01F 27/29 |
| 2018/0096780 | A1* | 4/2018 | Sekiguchi | H01F 27/2804 |
| 2021/0065975 | A1* | 3/2021 | Ishima | H01F 41/04 |

FOREIGN PATENT DOCUMENTS

| | | | |
|---|---|---|---|
| JP | H11-251146 | A | 9/1999 |
| JP | 2005-039187 | A | 2/2005 |
| JP | 2017-174970 | A | 9/2017 |
| JP | 2017-216428 | A | 12/2017 |
| JP | 2018-074134 | A | 5/2018 |

* cited by examiner

INDUCTOR COMPONENT AND MOUNTING STRUCTURE OF INDUCTOR COMPONENT

CROSS-REFERENCE TO RELATED APPLICATION

This application claims benefit of priority to Japanese Patent Application No. 2021-115688, filed Jul. 13, 2021, the entire content of which is incorporated herein by reference.

BACKGROUND

Technical Field

The present disclosure relates to an inductor component and a mounting structure of the inductor component.

Background Art

Conventionally, as an inductor component, there is an inductor component described in Japanese Patent Application Laid-Open No. 11-251146 A. The inductor component includes an element body having a length, a width, and a height, a coil provided in the element body and wound along a direction of axis, and a first external electrode and a second external electrode provided on the element body and electrically connected to the coil. The length of the element body is longer than the width and height of the element body. The axis of the coil is disposed in parallel to a length direction of the element body.

SUMMARY

Meanwhile, in the conventional inductor component, since the coil is wound along the length direction of the element body, an inner diameter of the coil is determined by the width and height of the element body. Since the width and the height are shorter than the length, the inner diameter of the coil becomes small, and it is difficult to increase acquisition efficiency of inductance.

Therefore, the present disclosure provides an inductor component and a mounting structure of the inductor component capable of securing the number of windings of a coil while increasing an inner diameter of the coil, increasing acquisition efficiency of inductance, and securing strength against a thermal load caused by a difference in linear expansion coefficient between the coil and an element body while securing the number of windings of the coil.

An inductor component as one aspect of the present disclosure includes an element body having a length, a width, and a height; a coil provided on the element body, having a spiral shape and wound along an axis; and a first external electrode and a second external electrode provided on the element body and electrically connected to the coil. The element body includes a substrate having a first main surface and a second main surface opposite to each other. The axis of the coil is disposed in parallel to a direction of a shorter dimension among the length, the width, and the height of the element body. The coil includes a plurality of first coil wirings provided on the first main surface, a plurality of second coil wirings provided on the second main surface, a plurality of first through wirings provided so as to penetrate the substrate from the first main surface to the second main surface and arranged along the axis, and a plurality of second through wirings provided so as to penetrate the substrate from the first main surface to the second main surface, and disposed on an opposite side of the first through wirings with respect to the axis, and arranged along the axis. The first coil wirings, the first through wirings, the second coil wirings, and the second through wirings are connected in the following order to constitute at least a part of the spiral shape. With respect to two of the first through wirings adjacent to each other in a direction of the axis, on the first main surface, $r1/g1 \leq 4$ is satisfied, where r1 is a radius of an equivalent circle diameter of an end surface of each of the first through wirings and g1 is a minimum distance between end surfaces of the two first through wirings. With respect to two of the second through wirings adjacent to each other in the direction of the axis, on the first main surface, $r2/g2 \leq 4$ is satisfied, where r2 is a radius of an equivalent circle diameter of an end surface of each of the second through wirings and g2 is a minimum distance between end surfaces of the two second through wirings.

The shorter dimension refers to any one of two dimensions excluding a longest dimension when all of the length, the width, and the height are different, refers to any one of two dimensions among the length, the width, and the height when the two dimensions are the same and the two dimensions are shorter than the other one dimension, refers to the other one dimension among the length, the width, and the height when the two dimensions are the same and the two dimensions are longer than the other one dimension, and refers to any one of the three dimensions when all of the length, the width, and the height are the same.

Further, "on the main surface of the substrate" refers not to an absolute one direction such as a vertical upward defined in the direction of gravity, but to a direction toward an outside out of an outside and an inside of the substrate with the main surface being a boundary. Therefore, "on the main surface" is a relative direction determined by a direction of the main surface. Furthermore, "above" with respect to an element includes not only an upper position away from the element, that is, an upper position with another object interposed therebetween on the element or an upper position at an interval, but also a position in contact with and immediately above (on) the element.

According to the above aspect, since the axis of the coil is disposed in parallel to the direction of the shorter dimension among the length, the width, and the height of the element body, the coil is wound along the direction of the shorter dimension of the element body. Thus, a largest value of an inner diameter of the coil can be increased to a longer dimension of the length, the width, and the height of the element body, and the inner diameter of the coil can be increased. Moreover, since the coil includes the plurality of first coil wirings and the plurality of second coil wirings, the plurality of first through wirings, and the plurality of second through wirings, the number of windings of the coil can be secured. Therefore, the number of windings of the coil can be secured while increasing the inner diameter of the coil, and acquisition efficiency of inductance can be enhanced.

Further, since $r1/g1 \leq 4$ is satisfied, a volume of the substrate between the two first through wirings adjacent to each other in the direction of the axis can be secured, and since $r2/g2 \leq 4$ is satisfied, the volume of the substrate between the two second through wirings adjacent to each other in the direction of the axis can be secured. Therefore, there is a difference in the linear expansion coefficient between the through wirings and the substrate, and shearing stress is generated in the substrate due to the thermal load, but since the volume of the substrate between the through wirings can be secured, the shearing stress can be reduced, and strength of the substrate can be secured. Therefore, it is possible to secure strength against a thermal load while securing the number of windings of the coil by increasing the quantity of through wirings. Note that $r1/g1 \leq 4$ means that r1 of either of the two first through wirings adjacent in the direction of the axis is satisfied. However, $r1/g1 \leq 4$ does not need to be satisfied in all sets of two first through wirings adjacent to each other, and it is sufficient if $r1/g1 \leq 4$ is satisfied in at least one set of two first through wirings adjacent to each other. The same applies to $r2/g2 \leq 4$.

Preferably, in one embodiment of the inductor component, the element body includes an insulating layer covering at least the first coil wirings on the first main surface or the second coil wirings on the second main surface.

According to the above embodiment, the coil wirings can be protected from solder and environmental stress during mounting by the insulating layer. Further, by increasing an insulation property of the insulating layer as compared with the substrate, an eddy current can be suppressed, and a Q value can be improved.

Preferably, in one embodiment of the inductor component, the first through wirings and the second through wirings extend in a direction orthogonal to the first main surface.

According to the above embodiment, since the lengths of the first through wirings and the second through wirings can be shortened, direct current resistance (Rdc) can be suppressed.

Preferably, in one embodiment of the inductor component, the axis of the coil is disposed in parallel to a direction of a shortest dimension among the length, the width, and the height of the element body.

According to the above embodiment, the inner diameter of the coil can be made larger, and the acquisition efficiency of inductance can be further enhanced.

Preferably, in one embodiment of the inductor component, on the first main surface, a line connecting centroids of end surfaces of the plurality of first through wirings is parallel to the axis of the coil, and a line connecting centroids of end surfaces of the plurality of second through wirings is parallel to the axis of the coil.

According to the above embodiment, the coil inner diameter can be made constant along the direction of the axis, and the acquisition efficiency of inductance can be further enhanced.

Preferably, in one embodiment of the inductor component, the first coil wirings extend only in one direction.

According to the above embodiment, since the first coil wirings extend only in one direction, fine first coil wirings can be formed by using, for example, modified illumination in the photolithography process, and the inductor component can be downsized.

Here, in a photolithography process, when deformed illumination such as annular illumination or dipole illumination is used for example, pattern resolution in a specific direction can be enhanced to form a finer pattern.

Preferably, in one embodiment of the inductor component, the second coil wirings extend only in one direction.

According to the above embodiment, the second coil wirings extend only in one direction, fine second coil wirings can be formed by using, for example, modified illumination in the photolithography process, and the inductor component can be downsized.

Preferably, in one embodiment of the inductor component, as viewed from a direction orthogonal to the first main surface, a first end portion of each of the first coil wirings and a first end portion of each of the second coil wirings overlap each other, and an angle formed by the first coil wiring and the second coil wiring is 5 degrees or more and 45 degrees or less (i.e., from 5 degrees to 45 degrees).

According to the above embodiment, since the coil is densely wound, the inductance can be improved.

Preferably, in one embodiment of the inductor component, at least the first through wirings or the second through wirings include a plurality of conductor layers.

According to the above embodiment, the type of the conductor layer can be selected, and the through wirings can be formed according to the application.

Preferably, in one embodiment of the inductor component, a quantity of the first through wirings and a quantity of the second through wirings are the same, and the first through wiring and the second through wiring are line-symmetric with respect to the axis of the coil as viewed from the direction orthogonal to the first main surface.

According to the above embodiment, in a case where the quantities of the first through wirings and the second through wirings are the same, the size of the coil in the direction of the axis can be reduced as compared with a case where these are asymmetric with respect to the axis of the coil, and the inductor component can be downsized.

Preferably, in one embodiment of the inductor component, a difference between the quantity of the first through wirings and the quantity of the second through wirings is 1, and the first through wirings and the second through wirings are alternately arranged with respect to the axis along the direction of the axis of the coil as viewed from a direction orthogonal to the first main surface.

According to the above embodiment, in a case where a difference in the quantities of the first through wirings and the second through wirings is one, the size of the coil in the direction of the axis can be reduced as compared with a case where these are line-symmetric with respect to the axis of the coil, and the inductor component can be downsized.

Preferably, in one embodiment of the inductor component, a volume of the inductor component is equal to or less than 0.08 $mm^3$, and a size of a long side of the inductor component is equal to or less than 0.65 mm.

Here, the size of the long side of the inductor component refers to the largest value among the length, the width, and the height of the inductor component.

According to the above embodiment, since the volume of the inductor component is small and the long side of the inductor component is also small, the weight of the inductor component is reduced. Thus, if the external electrodes are small, required mounting strength can be obtained.

Preferably, in one embodiment of the inductor component, a length of the first through wiring in an extending direction is equal to or more than five times an equivalent circle diameter of an end surface of the first through wiring on the first main surface, and a length of the second through wiring in the extending direction is equal to or more than five times an equivalent circle diameter of an end surface of the second through wiring on the first main surface.

According to the above embodiment, since the aspect ratio of the first through wiring and the second through wiring can be increased, the inner diameter of the coil can be increased, and the acquisition efficiency of inductance can be further increased.

Preferably, in one embodiment of a mounting structure of an inductor component, the mounting structure includes a mounting substrate; and the inductor component mounted on a mounting surface of the mounting substrate, with the axis of the coil being parallel to the mounting surface.

According to the above embodiment, since the axis of the coil is parallel to the mounting surface, magnetic flux of the inductor component is not affected by the wiring portion of the mounting substrate, and a decrease in the acquisition efficiency of inductance can be suppressed.

Preferably, in one embodiment of a mounting structure of an inductor component, the mounting structure includes a mounting substrate; and the inductor component mounted on a mounting surface of the mounting substrate, with the axis of the coil being orthogonal to the mounting surface.

According to the above embodiment, since the axis of the coil is orthogonal to the mounting surface, the magnetic flux of the inductor component does not affect other inductor components adjacent to the inductor component, and the degree of freedom of the mounting layout is improved.

Preferably, in one embodiment of the mounting structure of the inductor component, the mounting substrate has a wiring portion on the mounting surface, and the axis of the coil does not overlap the wiring portion.

According to the above embodiment, the axis of the coil does not overlap with the wiring portion, it is possible to suppress the magnetic flux of the inductor component from being hindered by the wiring portion, and it is possible to suppress a decrease in the acquisition efficiency of inductance.

Preferably, in one embodiment of the mounting structure of the inductor component, the inductor component is disposed on the mounting surface in such a manner that a direction of a shortest dimension among the length, the width, and the height of the element body is orthogonal to the mounting surface.

According to the above embodiment, the direction of the shortest dimension among the length, the width, and the height of the element body is a thickness direction in a state of being disposed on the mounting surface, and the thickness of the inductor component can be reduced.

Preferably, in one embodiment of the mounting structure of the inductor component, the inductor component is disposed on the mounting surface in such a manner that a direction of a longest dimension among the length, the width, and the height of the element body is orthogonal to the mounting surface.

According to the above embodiment, a direction of a shorter dimension among the length, the width, and the height of the element body determines the mounting surface of the inductor component, and the mounting area of the inductor component can be reduced.

With an inductor component and a mounting structure of the inductor component as one aspect of the present disclosure, the number of windings of a coil can be secured while increasing an inner diameter of the coil, acquisition efficiency of inductance can be increased, and strength can be secured against a thermal load caused by a difference in linear expansion coefficient between the coil and an element body while securing the number of windings of the coil.

DETAILED DESCRIPTION

Hereinafter, an inductor component and a mounting structure of the inductor component as one aspect of the present disclosure will be described in detail with reference to an illustrated embodiment. Note that the drawings include some schematic drawings, and may not reflect actual dimensions and ratios.

First Embodiment

Figure 1:
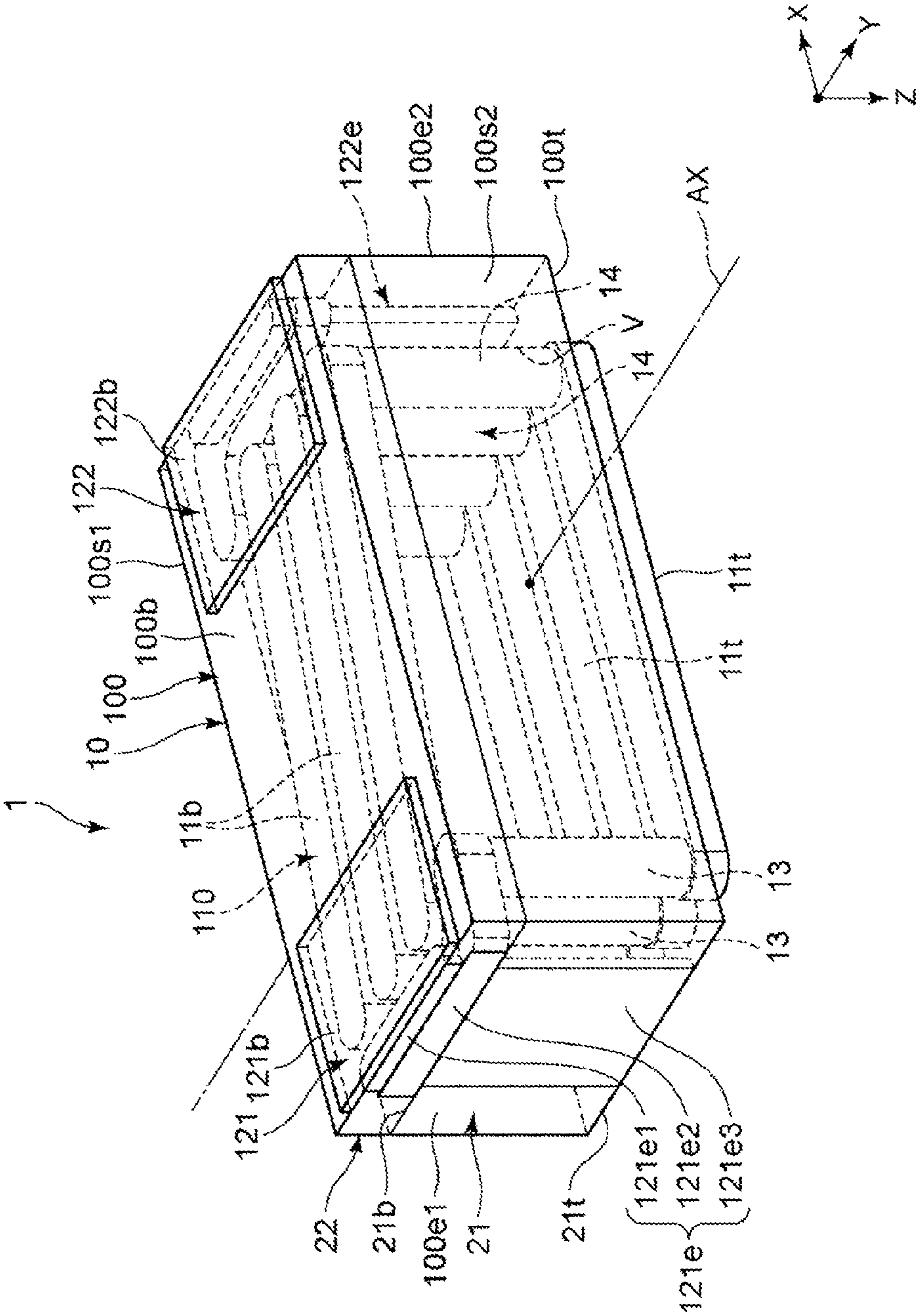
FIG. 1 is a schematic perspective view of an inductor component as viewed from a bottom surface side.
Figure 2:
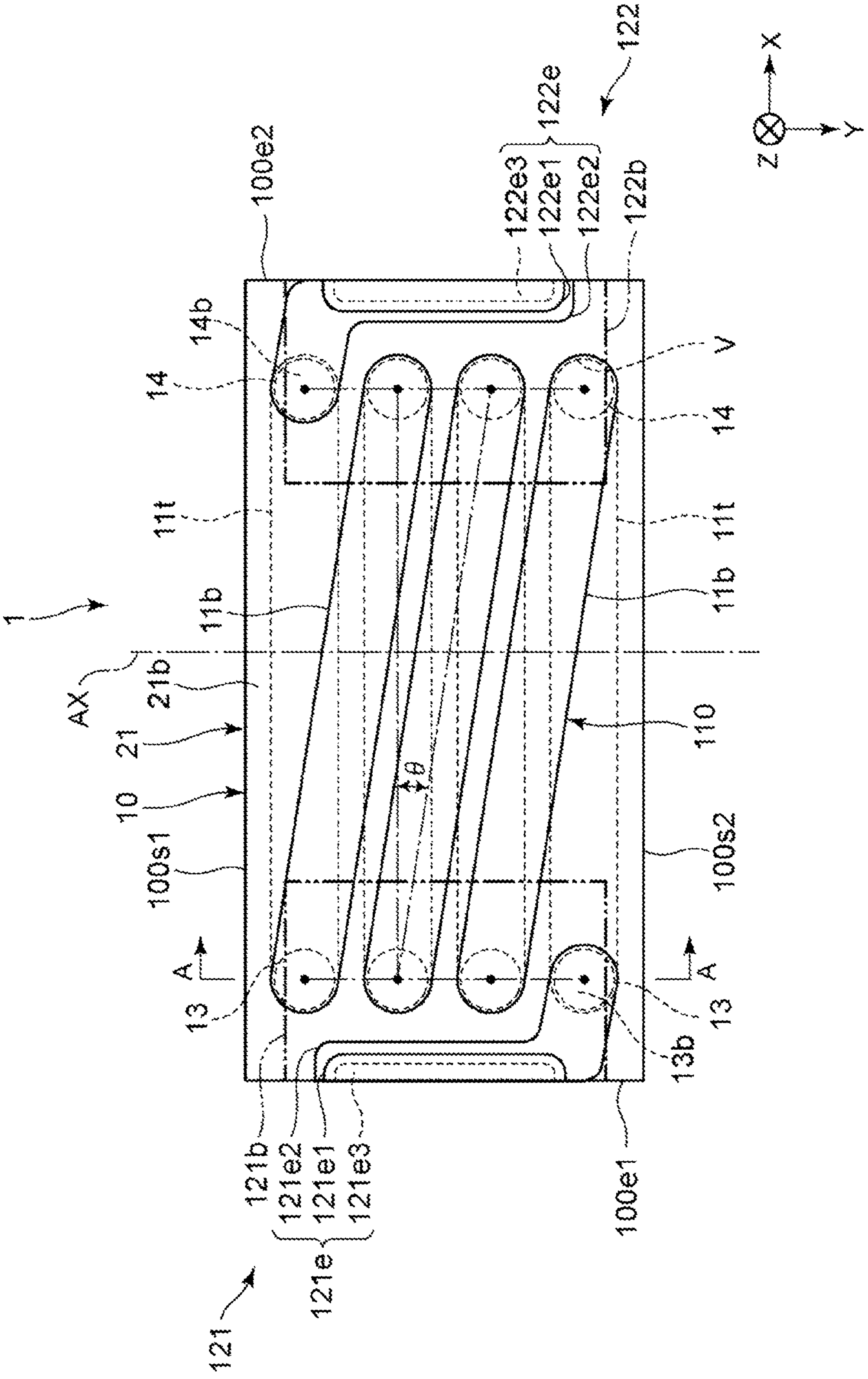
FIG. 2 is a schematic bottom view of the inductor component as viewed from the bottom surface side.
Figure 3:
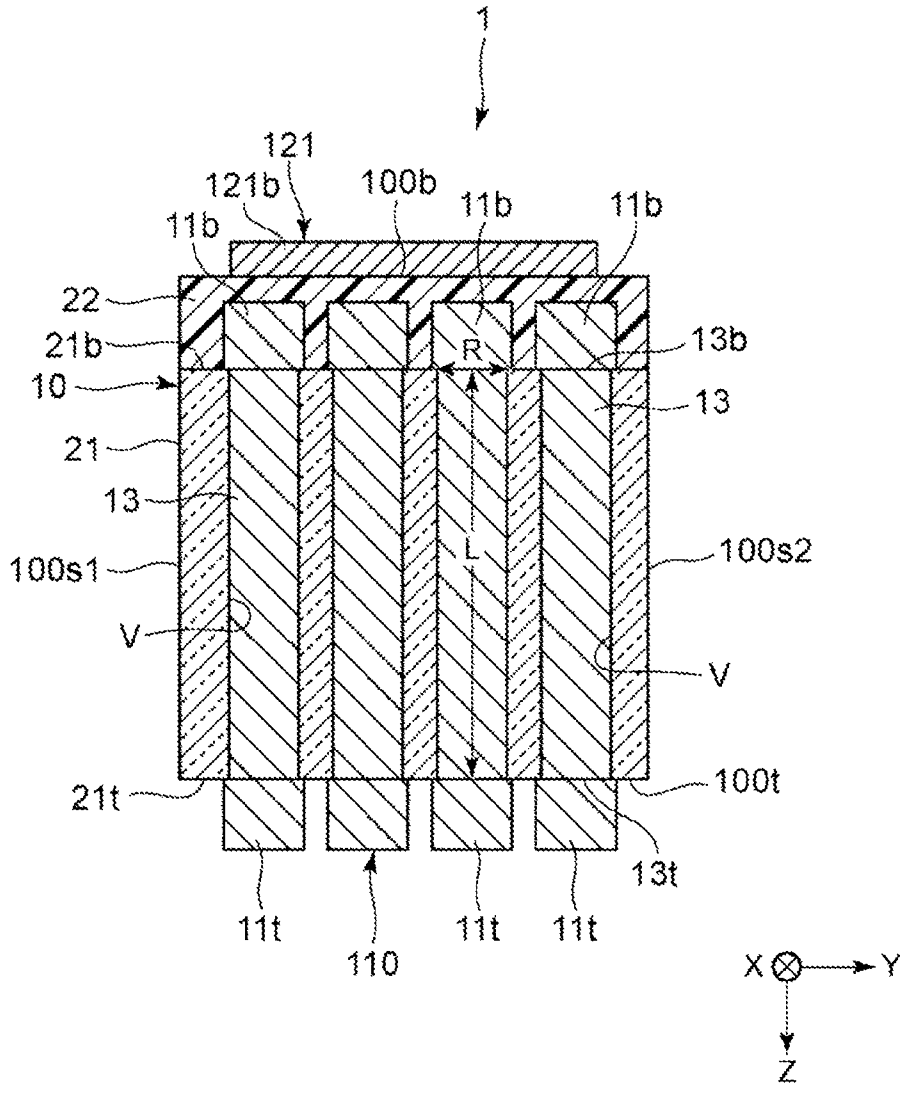
FIG. 3 is a sectional view taken along line A-A of FIG. 2.

An inductor component 1 according to a first embodiment will be described below. FIG. 1 is a schematic perspective view of the inductor component 1 as viewed from a bottom surface side. FIG. 2 is a schematic bottom view of the inductor component 1 as viewed from the bottom surface side. FIG. 3 is a sectional view taken along line A-A of FIG. 2. Note that, in FIG. 2, for convenience, an insulating layer of the element body is omitted, and a part (bottom surface portion) of an external electrode is drawn by a two-dot chain line.

1. Summary Configuration

A schematic configuration of the inductor component 1 will be described. The inductor component 1 is, for example, a surface mount type inductor component used in a high-frequency signal transmission circuit. As illustrated in FIGS. 1, 2, and 3, the inductor component 1 includes an element body 10, a coil 110 provided on the element body 10 and spirally wound along an axis AX, and a first external electrode 121 and a second external electrode 122 provided on the element body 10 and electrically connected to the coil 110. The axis AX of the coil 110 is a straight line passing through a center of an inner diameter portion of the coil 110. The axis AX of the coil 110 does not have a dimension in a direction orthogonal to the axis AX.

The element body 10 has a length, a width, and a height. The element body 10 has a first end surface **100*e*1 and a second end surface 100*e*2 on both end sides in a length direction, a first side surface 100*s*1** and a second side surface 100*s*2 on both end sides in a width direction, and a bottom surface 100*b* and a top surface 100*t* on both end sides in a height direction. That is, an outer surface 100 of the element body 10 includes the first end surface 100*e*1 and the second end surface 100*e*2, the first side surface 100*s*1 and the second side surface 100*s*2, and the bottom surface 100*b* and the top surface 100*t*.

Note that as illustrated in the drawings, hereinafter, for convenience of description, a direction from the first end surface 100*e*1 toward the second end surface 100*e*2 in the length direction (longitudinal direction) of the element body 10 is defined as an X direction. Further, a direction from the first side surface 100*s*1 toward the second side surface 100*s*2 in the width direction of the element body 10 is defined as a Y direction. Furthermore, a height direction of the element body 10, that is, a direction from the bottom surface 100*b* toward the top surface 100*t* is defined as a Z direction. The X direction, the Y direction, and the Z direction are directions orthogonal to each other, and form a right-handed coordinate system when arranged in the order of X, Y, and Z.

In this description, the "outer surface 100 of the element body" including the first end surface 100*e*1, the second end surface 100*e*2, the first side surface 100*s*1, the second side surface 100*s*2, the bottom surface 100*b*, and the top surface 100*t* of the element body 10 does not simply mean a surface facing an outer peripheral side of the element body 10, but is a surface as a boundary between an outside and an inside of the element body 10. Further, "above the outer surface 100 of the element body 10" refers not to an absolute one direction such as a vertical upward defined in the direction of gravity, but to a direction toward an outside with respect to the outer surface 100 out of an outside and an inside with the outer surface 100 being a boundary. Therefore, the "above the outer surface 100" is a relative direction determined by the direction of outer surface 100. Furthermore, "above" with respect to an element includes not only an upper position away from the element, that is, an upper position with another object interposed therebetween on the element or an upper position at an interval, but also a position in contact with and immediately above (on) the element.

The element body 10 includes a substrate 21 and an insulating layer 22 provided on the substrate 21. The substrate 21 has a bottom surface 21*b* and a top surface 21*t* opposite to each other in the Z direction. The insulating layer 22 is provided on the bottom surface 21*b* of the substrate 21. The bottom surface 21*b* corresponds to an example of a "first main surface" described in the claims, and the top surface 21*t* corresponds to an example of a "second main surface" described in the claims.

The axis AX of the coil 110 is disposed in parallel to a direction of a shorter dimension among the length, the width, and the height of the element body 10. Here, in the element body 10, the length (dimension in the X direction), the height (Z direction), and the width (dimension in the Y direction) are shortened in this order. Since all of the length, the width, and the height are different, the shorter dimension refers to any one of two dimensions (height and width) except the longest dimension (length). In this embodiment, a short dimension is defined as a width, and the axis AX of the coil 110 is disposed in parallel to the width direction of the element body 10.

The coil 110 includes a plurality of bottom surface wirings 11*b* provided on the bottom surface 21*b* and covered with the insulating layer 22, a plurality of top surface wirings 11*t* provided on the top surface 21*t*, a plurality of first through wirings 13 provided so as to penetrate the substrate 21 from the bottom surface 21*b* to the top surface 21*t* and arranged along the axis AX, and a plurality of second through wirings 14 provided so as to penetrate the substrate 21 from the bottom surface 21*b* to the top surface 21*t*, and disposed on an opposite side of the first through wirings 13 with respect to the axis AX, and arranged along the axis AX.

The bottom surface wirings 11*b* correspond to an example of "first coil wirings" described in the claims, and the top surface wirings 11*t* correspond to an example of "second coil wirings" described in the claims. The bottom surface wirings 11*b*, the first through wirings 13, the top surface wirings 11*t*, and the second through wirings 14 are connected in this order to constitute at least a part of a spiral shape.

The first external electrode 121 is provided on the bottom surface 100*b* and the first end surface 100*e*1 of the element body 10. Describing specifically, a part of the first external electrode 121 is provided on the insulating layer 22 above the bottom surface wiring 11*b* and away from the bottom surface wiring 11*b*, and another part of the first external electrode 121 is embedded in the first end surface 100*e*1 so as to be exposed from the first end surface 100*e*1.

The second external electrode 122 is provided on the bottom surface 100*b* and the second end surface 100*e*2 of the element body 10. Describing specifically, a part of the second external electrode 122 is provided on the insulating layer 22 above the bottom surface wiring 11*b* and away from the bottom surface wiring 11*b*, and another part of the second external electrode 122 is embedded in the second end surface 100*e*2 so as to be exposed from the second end surface 100*e*2.

As illustrated in FIG. 3, the first through wirings 13 each have an end surface 13*b* on the bottom surface side connected to the bottom surface wiring 11*b* and an end surface 13*t* on a top surface side connected to the top surface wiring 11*t*. Similarly, the second through wirings 14 each have an end surface 14*b* on the bottom surface side connected to the bottom surface wiring 11*b* and an end surface 14*t* on the top surface side connected to the top surface wiring 11*t*.

Figure 4A:
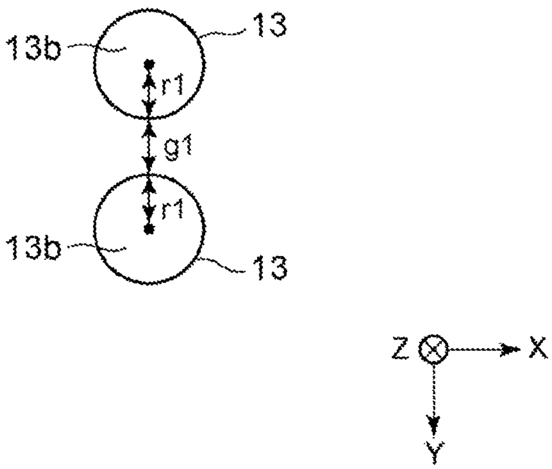
FIG. 4A is a view of a first through wiring as viewed from the bottom surface side.

FIG. 4A is a view of the first through wirings 13 as viewed from the bottom surface 21*b* side. As illustrated in FIG. 4A, with respect to two of the first through wirings 13 adjacent to each other in a direction of the axis AX (parallel to the Y direction), on the bottom surface 21*b*, $r1/g1 \leq 4$ is satisfied, where r1 is a radius of an equivalent circle diameter of the end surface 13*b* of the first through wiring 13, and g1 is a minimum distance between the end surfaces 13*b* of the two first through wirings 13. At this time, it is preferable that $r1/g1 \leq 4$ is satisfied in all the first through wirings 13, but it is sufficient if $r1/g1 \leq 4$ is satisfied in at least one set of two first through wirings 13 adjacent to each other. In all the first through wirings 13, r1/g1 is preferably the same, but may be different.

Figure 4B:
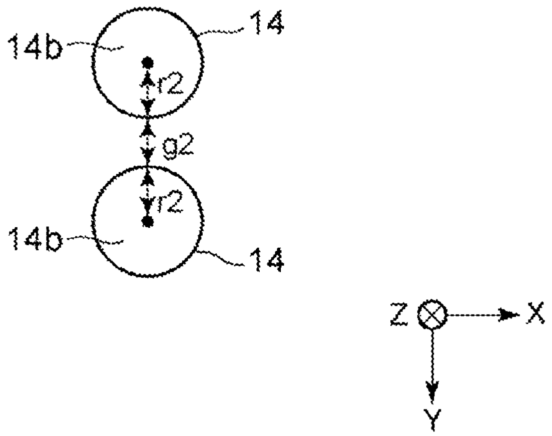
FIG. 4B is a view of a second through wiring as viewed from the bottom surface side.

FIG. 4B is a view of the second through wiring 14 as viewed from the bottom surface 21*b* side. As illustrated in FIG. 4B, with respect to two of the second through wirings 14 adjacent to each other in the direction of the axis AX, on the bottom surface 21*b*, $r2/g2 \leq 4$ is satisfied, where r2 is a radius of an equivalent circle diameter of the end surface 14*b* of the second through wiring 14, and g2 is a minimum distance between the end surfaces 14*b* of the two second through wirings 14. At this time, it is preferable that $r1/g1 \leq 4$ is satisfied in all the second through wirings 14, but it is sufficient if $r1/g1 \leq 4$ is satisfied in at least one set of two second through wirings 14 adjacent to each other. In all the second through wirings 14, r2/g2 is preferably the same, but may be different.

According to the above configuration, since the axis of the coil 110 is disposed in parallel to the direction of the shorter dimension among the length, the width, and the height of the element body 10, the coil 110 is wound along the direction of the shorter dimension of the element body 10. Thus, a largest value of an inner diameter of the coil 110 can be increased to a longer dimension of the length, the width, and the height of the element body 10, and the inner diameter of the coil 110 can be increased. Moreover, since the coil 110 includes the plurality of bottom surface wirings 11*b*, the plurality of top surface wirings 11*t*, the plurality of first through wirings 13, and the plurality of second through wirings 14, the number of windings of the coil 110 can be secured. Therefore, the number of windings of the coil 110 can be secured while increasing the inner diameter of the coil 110, and acquisition efficiency of inductance can be enhanced.

Further, since $r1/g1 \leq 4$ is satisfied, the volume of the substrate 21 between the two first through wirings 13 adjacent to each other in the direction of the axis AX can be secured, and since $r2/g2 \leq 4$ is satisfied, the volume of the substrate 21 between the two second through wirings 14 adjacent to each other in the direction of the axis AX can be secured. Therefore, there is a difference in the linear expansion coefficient between the first and second through wirings 13 and 14 and the substrate 21, and shearing stress is generated in the substrate 21 due to the thermal load. However, since the volume of the substrate 21 between the first through wirings 13 adjacent to each other and the volume of the substrate 21 between the second through wirings 14 adjacent to each other can be secured, the shearing stress can be reduced, and strength of the substrate 21 can be secured. Therefore, it is possible to secure strength against a thermal load while securing the number of windings of the coil 110 by increasing the quantities of the first and second through wirings 13 and 14.

Preferably, with respect to two of the first through wirings 13 adjacent to each other in the direction of the axis AX, on the top surface 21*t*, $r1/g1 \leq 4$ is satisfied, where r1 is a radius of an equivalent circle diameter of the end surface 13*t* on the top surface side of the first through wiring 13 and g1 is a minimum distance between the end surfaces 13*t* on the top surface side of the two first through wirings 13. At this time, it is preferable that $r1/g1 \leq 4$ is satisfied in all the first through wirings 13, but it is sufficient if $r1/g1 \leq 4$ is satisfied in at least one set of two first through wirings 13 adjacent to each other. Further, in all the first through wirings 13, r1/g1 is preferably the same, but may be different. Preferably, with respect to two of the second through wirings 14 adjacent to each other in the direction of the axis AX, on the top surface 21*t*, $r2/g2 \leq 4$ is satisfied, where r2 is a radius of an equivalent circle diameter of the end surface 14*t* on the top surface side of the second through wiring 14, and g2 is a minimum distance between the end surfaces 14*t* of the two second through wirings 14. At this time, it is preferable that $r2/g2 \leq 4$ is satisfied in all the second through wirings 14, but it is sufficient if $r2/g2 \leq 4$ is satisfied in at least one set of two second through wirings 14 adjacent to each other. Further, in all the second through wirings 14, r2/g2 is preferably the same, but may be different. Therefore, it is possible to further secure the strength against the thermal load while securing the number of windings of the coil 110 by increasing the quantities of the first and second through wirings 13 and 14.

2. Configuration of Each Unit (Inductor Component 1)

The volume of the inductor component 1 is equal to or less than 0.08 $mm^3$, and the size of a long side of the inductor component 1 is equal to or less than 0.65 mm. The size of the long side of the inductor component 1 refers to the largest value among the length, the width, and the height of the inductor component 1, and in this embodiment, refers to the length in the X direction. According to the above configuration, since the volume of the inductor component 1 is small and the long side of the inductor component 1 is also short, the weight of the inductor component 1 is reduced. Thus, if the external electrodes 121 and 122 are small, required mounting strength can be obtained.

Describing specifically, the size (length (X direction)×width (Y direction)×height (Z direction)) of the inductor component 1 is 0.6 mm×0.3 mm×0.3 mm, 0.4 mm×0.2 mm×0.2 mm, 0.25 mm×0.125 mm×0.120 mm, or the like. Further, the width and the height do not need to be equal, and may be, for example, 0.4 mm×0.2 mm×0.3 mm or the like.

(Element Body 10)

The element body 10 includes the substrate 21 having the bottom surface 21*b* and the top surface 21*t* on both end sides in the Z direction, and the insulating layer 22 covering the bottom surface 21*b* of the substrate 21. As described above, since the insulating layer 22 covers the bottom surface wiring 11*b*, the insulating layer 22 can protect the bottom surface wiring 11*b* from solder and environmental stress at the time of mounting. Further, by increasing an insulation property of the insulating layer 22 as compared with the substrate 21, an eddy current can be suppressed, and a Q value can be improved. The insulating layer 22 may be provided on each of the bottom surface 21*b* and the top surface 21*t*. That is, it is sufficient if the insulating layer 22 covers at least one of the bottom surface wiring 11*b* or the top surface wiring 11*t*.

The material of the substrate 21 is preferably glass, and accordingly, due to the high insulation property of the glass, the eddy current can be suppressed, and the Q value can be increased. The substrate 21 preferably contains an Si element, and accordingly, the thermal stability of the substrate 21 is high, and thus it is possible to suppress variation in dimensions of the element body 10 and the like due to heat and to reduce fluctuation in electrical characteristics.

The substrate 21 is preferably a single-layer glass plate. Accordingly, strength of the element body 10 can be secured. Further, in a case of the single-layer glass plate, since the dielectric loss is small, the Q value at high frequency can be increased. Furthermore, since there is no sintering step of a sintered body or the like, deformation of the element body 10 during sintering can be suppressed, so that pattern deviation can be suppressed, and an inductor component with small inductance tolerance can be provided.

As a material of the single-layer glass plate, a glass plate having photosensitivity represented by Foturan II (registered trademark of Schott AG) is preferable from the viewpoint of a production method. In particular, the single-layer glass plate preferably contains cerium oxide (ceria: $CeO_2$), and in this case, the cerium oxide serves as a sensitizer, and processing by photolithography becomes easier.

However, since the single-layer glass plate can be processed by machining such as drilling and sandblasting, dry/wet etching processing using a photoresist/metal mask or the like, laser processing, or the like, the single-layer glass plate may be a glass plate having no photosensitivity.

Further, the single-layer glass plate may be obtained by sintering a glass paste, or may be formed by a known method such as a float method.

The single-layer glass plate is a single-layer plate-like member that does not take in a wiring (a part of the coil 110), such as an internal conductor integrated inside a glass body. In particular, the single-layer glass plate has the outer surface as a boundary between the outside and the inside as a glass body. Through holes V formed in the single-layer glass plate is included in the outer surface 100 of the element body 10 because they are also a boundary between the outside and the inside of the glass body.

The single-layer glass plate is basically in an amorphous state, but may have a crystallized portion. For example, in the case of the Foturan II, the dielectric constant of glass in an amorphous state is 6.4, whereas the dielectric constant can be reduced to 5.8 by crystallization. Thus, a stray capacitance between the conductors (between the wirings) in the vicinity of the crystallized portion can be reduced.

The insulating layer 22 is a member that protects the wiring (bottom surface wiring 11*b*) from an external force by covering the wiring and has a role of preventing damage to the wiring and a role of improving an insulation property of the wiring. The insulating layer 22 is preferably an inorganic film of, for example, an oxide such as silicon or hafnium, a nitride, an oxynitride, or the like, which is excellent in insulation properties and thinning. However, the insulating layer 22 may be a resin film of epoxy, polyimide, or the like which is more easily formed. In particular, the insulating layer 22 is preferably formed by a material having a low dielectric constant, so that in a case where the insulating layer 22 is present between the coil 110 and the external electrodes 121 and 122, the stray capacitance formed between the coil 110 and the external electrodes 121 and 122 can be reduced.

The insulating layer 22 can be formed by, for example, laminating a resin film such as ABF GX-92 (manufactured by Ajinomoto Fine-Techno Co., Inc.), applying a paste-like resin, thermally curing the resin film, or the like.

Preferably, the thickness of the insulating layer 22 is equal to or less than one third of the thickness of the substrate 21, and the dielectric constant of the insulating layer 22 is smaller than the dielectric constant of the substrate 21. The thickness is the maximum value of a size in a direction orthogonal to the bottom surface 21*b*. Accordingly, the thickness of the insulating layer 22 is reduced, and the inductor component 1 can be downsized. Further, if the thickness of the insulating layer 22 is reduced and the distance between the first and second external electrodes 121 and 122 and the bottom surface wiring 11*b* is shortened, the dielectric constant of the insulating layer 22 is smaller than the dielectric constant of the substrate 21, and thus the parasitic capacitance between the first and second external electrodes 121 and 122 and the bottom surface wiring 11*b* can be reduced and the Q value can be increased.

Note that the element body 10 may include a sintered body, that is, the substrate 21 may be a sintered body, and the strength of the element body 10 can be secured. Further, by using ferrite or the like for the sintered body, the acquisition efficiency of inductance can be increased.

The element body 10 may further include an insulating film that covers a part of the insulating layer 22 on the bottom surface 21*b* side. That is, the insulating film is positioned at least between the first external electrode 121 and the second external electrode 122 provided on the insulating layer 22, and a short circuit between the first external electrode 121 and the second external electrode 122 can be more reliably prevented. The material of the insulating film is, for example, the same material as the insulating layer 22.

(Coil 110)

The coil 110 includes the bottom surface wirings 11*b* disposed above the bottom surface 21*b* of the substrate 21 and covered with the insulating layer 22, the top surface wirings 11*t* disposed above the top surface 21*t* of the substrate 21, and pairs of the through wirings 13 and 14 that penetrate the substrate 21 across the bottom surface 21*b* and the top surface 21*t* and disposed on sides opposite to each other with respect to the axis AX. The bottom surface wirings 11*b*, the first through wirings 13, the top surface wirings 11*t*, and the second through wirings 14 are sequentially connected to constitute at least a part of the coil 110 wound in the direction of the axis AX.

According to the above configuration, since the coil 110 has what is called a helical shape, in a section orthogonal to the axis AX, the region where the bottom surface wiring 11*b*, the top surface wiring 11*t*, and the through wirings 13 and 14 run parallel along the winding direction of the coil 110 can be reduced, and the stray capacitance in the coil 110 can be reduced.

Here, the helical shape refers to a shape in which the number of turns of the all coil is larger than one turn and the number of turns of the coil in the section orthogonal to the axis is less than one turn. With respect to the number of turns of the coil in the section orthogonal to the axis, "one turn or more" refers to a state in which, in the section orthogonal to the axis, the wiring of the coil has portions that are adjacent in a radial direction as viewed from a direction of the axis and run parallel in a winding direction, and "less than one turn" refers to a state in which, in the section orthogonal to the axis, the wiring of the coil does not have the portions that are adjacent in the radial direction as viewed from the direction of the axis and run parallel in the winding direction. Note that the portions where the wirings run parallel includes not only an extending portion extending in the winding direction of the wirings but also a pad portion connected to an end of the extending portion and having a width larger than the width of the extending portion.

The axis AX of the coil 110 is disposed in parallel to the direction of the width, which is the shortest dimension among the length, the width, and the height of the element body 10. Accordingly, the inner diameter of the coil 110 can be made larger, and the acquisition efficiency of inductance can be further enhanced.

Preferably, as illustrated in FIG. 2, on the bottom surface 21*b*, a line (one-dot chain line) connecting the centroids of the end surfaces 13*b* of the plurality of first through wirings 13 is parallel to the axis AX of the coil 110, and a line (one-dot chain line) connecting the centroids of the end surfaces 14*b* of the plurality of second through wirings 14 is parallel to the axis AX of the coil 110. Accordingly, the coil inner diameter can be made constant along the direction of the axis, and the acquisition efficiency of inductance can be further enhanced. More preferably, on the top surface 21*t*, a line connecting the centroids of the end surfaces 13*t* of the plurality of first through wirings 13 is parallel to the axis AX of the coil 110, and a line connecting the centroids of the end surfaces 14*t* of the plurality of second through wirings 14 is parallel to the axis AX of the coil 110.

The bottom surface wirings 11*b* extend only in one direction. Describing specifically, the bottom surface wirings 11*b* are slightly inclined in the Y direction and extends in the X direction. The plurality of bottom surface wirings 11*b* is arranged side by side along the Y direction and disposed in parallel to each other. Here, in a photolithography process, when deformed illumination such as annular illumination or dipole illumination is used for example, pattern resolution in a specific direction can be enhanced to form a finer pattern. According to the above configuration, since the bottom surface wirings 11*b* extend only in one direction, the fine bottom surface wirings 11*b* can be formed by using, for example, modified illumination in the photolithography process, and the inductor component 1 can be downsized. Specifically, in a case where the bottom surface wirings 11*b* extend only in one direction, lines between the bottom surface wirings 11*b* are in a direction orthogonal to the one direction, and thus, by enhancing pattern resolution in this orthogonal direction, formation accuracy between the lines between the bottom surface wirings 11*b* can be improved more than usual.

The top surface wirings 11*t* extend only in one direction. Describing specifically, the top surface wirings 11*t* have a shape extending in the X direction. A plurality of top surface wirings 11*t* is arranged side by side along the Y direction and disposed in parallel to each other. According to the above configuration, since the top surface wirings 11*t* extend only in one direction, the fine top surface wirings 11*t* can be formed by using, for example, modified illumination in the photolithography process, and the inductor component 1 can be downsized.

The first through wirings 13 are disposed on the first end surface 100*e*1 side with respect to the axis AX in the through holes V of the element body 10, and the second through wirings 14 are disposed on the second end surface 100*e*2 side with respect to the axis AX in the through holes V of the element body 10. Each of the first through wirings 13 and the second through wirings 14 extends in a direction orthogonal to the bottom surface 21*b* and the top surface 21*t* (the bottom surface 100*b* and the top surface 100*t*). Accordingly, since lengths of the first through wirings 13 and the second through wirings 14 can be shortened, direct current resistance (Rdc) can be suppressed. The plurality of first through wirings 13 and the plurality of second through wirings 14 are arranged side by side along the Y direction and are disposed in parallel to each other.

The bottom surface wirings 11*b* and the top surface wirings 11*t* are formed by a good conductor material such as copper, silver, gold, or an alloy thereof. The bottom surface wirings 11*b* and the top surface wirings 11*t* may be a metal film formed by plating, vapor deposition, sputtering, or the like, or may be a metal sintered body obtained by applying and sintering a conductor paste. Further, the bottom surface wirings 11*b* and the top surface wirings 11*t* may have a multilayer structure in which a plurality of metal layers is stacked. Thicknesses of the bottom surface wirings 11*b* and the top surface wirings 11*t* are preferably 5 μm or more and 50 μm or less (i.e., from 5 μm to 50 μm).

The first through wirings 13 and the second through wirings 14 can be formed in the through holes V formed in advance in the element body 10 using the materials and manufacturing methods exemplified for the bottom surface wirings 11*b* and the top surface wirings 11*t*. Preferably, at least the first through wirings 13 or the second through wirings 14 include a plurality of conductor layers. Accordingly, the type of the conductor layer can be selected, and the through wirings can be formed according to the application. For example, the through wirings 13 and 14 can be formed by combining a conductor layer of TiN, Ti, Ni, or the like having high barrier properties and adhesion but low conductivity with a conductor layer of Cu, Ag, or the like having high conductivity. Further, by filling the cavity portion after the conformal plating with a conductive paste containing Cu or Ag filler by a printing method or the like, it is possible to form inexpensive and low-Rdc through wirings 13 and 14. Note that some of the through wirings 13 and 14 may have voids in order to alleviate stress.

Preferably, the bottom surface wirings 11*b*, the top surface wirings 11*t*, the first through wirings 13, and the second through wirings 14 are mainly constituted of copper. Accordingly, by using inexpensive and highly conductive copper as the material of the wirings, mass productivity of the inductor component 1 can be improved, and the Q value can be increased.

Preferably, as illustrated in FIG. 2, as viewed from a direction orthogonal to the bottom surface 21*b*, a first end portion of the bottom surface wiring 11*b* and a first end portion of the top surface wiring 11*t* overlap each other, and an angle θ formed by the bottom surface wiring 11*b* and the top surface wiring 11*t* is 5 degrees or more and 45 degrees or less (i.e., from 5 degrees to 45 degrees). The angle θ is an angle between a center line (one-dot chain line) of the width of the bottom surface wiring line 11*b* and a center line (one-dot chain line) of the width of the top surface wiring line 11*t* as viewed from the direction orthogonal to the bottom surface 21*b*.

According to the above configuration, since the coil 110 is densely wound due to the angle θ being 45 degrees or less, the inductance can be improved. Further, due to the angle θ being 5 degrees or more, the interval between the adjacent bottom surface wirings 11*b*, between the adjacent top surface wirings 11*t*, between the adjacent first through wirings 13, or between the adjacent second through wirings 14 is secured, and the occurrence of a short circuit can be reduced. Note that it is sufficient if the angle θ is 5 degrees or more and 45 degrees or less (i.e., from 5 degrees to 45 degrees), in at least one set of the bottom surface wiring 11*b* and the top surface wiring 11*t* of all the bottom surface wirings 11*b* and the top surface wirings 11*t*, and preferably, it is sufficient if the angle θ is 5 degrees or more and 45 degrees or less (i.e., from 5 degrees to 45 degrees) in all the sets of the bottom surface wirings 11*b* and the top surface wirings 11*t*.

Preferably, as illustrated in FIG. 2, the quantity of first through wirings 13 and the quantity of second through wirings 14 are the same, and the first through wirings 13 and the second through wirings 14 are line-symmetric with respect to the axis AX of the coil 110 as viewed from the direction orthogonal to the bottom surface 21*b*. In this embodiment, each of the quantity of first through wirings 13 and the quantity of second through wirings 14 is four.

According to the above configuration, in a case where the quantities of the first through wirings 13 and the second through wirings 14 are the same, the size of the coil 110 in the direction of the axis AX can be reduced as compared with a case where these are asymmetric with respect to the axis AX of the coil 110, and the inductor component 1 can be downsized.

Preferably, as illustrated in FIG. 3, a length L of the first through wiring 13 in an extending direction is equal to or more than five times the equivalent circle diameter R of the end surface 13*b* of the first through wiring 13 in the bottom surface 21*b*. Similarly, a length L of the second through wiring 14 in the extending direction is equal to or more than five times the equivalent circle diameter R of the end surface 14*b* of the second through wiring 14 on the bottom surface 21*b*. Accordingly, since the aspect ratio of the first through wiring 13 and the second through wiring 14 can be increased, the inner diameter of the coil 110 can be increased, and the acquisition efficiency of inductance can be further increased. Note that the length L of the first through wiring 13 in the extending direction is more preferably equal to or more than five times the equivalent circle diameter R of the end surface 13*t* of the first through wiring 13 on the top surface 21*t*. Similarly, the length L of the second through wiring 14 in the extending direction is more preferably equal to or more than five times the equivalent circle diameter R of the end surface 14*t* of the second through wiring 14 on the top surface 21*t*.

(First External Electrode 121 and Second External Electrode 122)

The first external electrode 121 is provided on the first end surface 100*e*1 side with respect to the center of the element body 10 in the X direction so as to be exposed from the outer surface 100 of the element body 10. The second external electrode 122 is provided on the second end surface 100*e*2 side with respect to the center of the element body 10 in the X direction so as to be exposed from the outer surface 100 of the element body 10.

The first external electrode 121 is connected to a first end of the coil 110, and the second external electrode 122 is connected to a second end of the coil 110. Each of the first external electrode 121 and the second external electrode 122 may be formed by a single-layer conductor material or may be formed by a multi-layer conductive material. In a case of the single-layer conductive material, for example, the base layer is formed by the same material as the coil 110, and in a case of the multi-layer conductive material, for example, the base layer is formed by the same material as the coil 110 and a plating layer covering the base layer.

The first external electrode 121 is provided continuously with the first end surface 100*e*1 and the bottom surface 100*b*. According to the above configuration, since the first external electrode 121 is an electrode having what is called an L-shape, a solder fillet can be formed on the first external electrode 121 when the inductor component 1 is mounted on a mounting substrate. Thus, the mounting strength of the inductor component 1 can be improved, and the mounting posture of the inductor component 1 can be further stabilized.

The first external electrode 121 has a first end surface portion 121*e* provided on the first end surface 100*e*1 and a first bottom surface portion 121*b* provided on the bottom surface 100*b*. The first end surface portion 121*e* and the first bottom surface portion 121*b* are connected. The first end surface portion 121*e* is embedded in the first end surface 100*e*1 so as to be exposed from the first end surface 100*e*1. The first bottom surface portion 121*b* is disposed on the bottom surface 100*b* so as to protrude from the bottom surface 100*b*. The first end surface portion 121*e* is connected to the first through wiring 13 of the coil 110.

The first end surface portion 121*e* has a first portion 121*e*1, a second portion 121*e*2, and a third portion 121*e*3 sequentially connected along the Z direction. The first portion 121*e*1 is connected to the first bottom surface portion 121*b* at the bottom surface 100*b*. The second portion 121*e*2 is connected to the first through wiring 13 in the element body 10. The third portion 121*e*3 is exposed from the substrate 21.

The second external electrode 122 is provided continuously with the second end surface 100*e*2 and the bottom surface 100*b*. According to the above configuration, since the second external electrode 122 is an electrode having what is called an L-shape, a solder fillet can be formed on the second external electrode 122 when the inductor component 1 is mounted on the mounting substrate. Thus, the mounting strength of the inductor component 1 can be improved, and the mounting posture of the inductor component 1 can be further stabilized.

The second external electrode 122 has a second end surface portion 122*e* provided on the second end surface 100*e*2 and a second bottom surface portion 122*b* provided on the bottom surface 100*b*. The second end surface portion 122*e* and the second bottom surface portion 122*b* are connected. The second end surface portion 122*e* is connected to the second through wiring 14 of the coil 110. The second end surface portion 122*e* is embedded in the second end surface 100*e*2 so as to be exposed from the second end surface 100*e*2. The second bottom surface portion 122*b* is disposed on the bottom surface 100*b* so as to protrude from the bottom surface 100*b*.

The second end surface portion 122*e* has a first portion 122*e*1, a second portion 122*e*2, and a third portion 122*e*3 sequentially connected along the Z direction. The first portion 122*e*1 is connected to the second bottom surface portion 122*b* at the bottom surface 100*b*. The second portion 122*e*2 is connected to the second through wiring 14 in the element body 10. The third portion 122*e*3 is exposed from the substrate 21.

(Relationship Between r1/g1 and r2/g2 and Shearing Stress)

A relationship between r1/g1 and the maximum value of the shearing stress will be described in the two first through wirings 13 adjacent to each other in the direction of the axis AX, where r1 is a value that is ½ of the radius of the equivalent circle diameter of the end surface 13*b* of the first through wiring 13, that is, the equivalent circle diameter, and g1 is a minimum distance between the end surfaces 13*b* of the two first through wirings 13, as viewed from the direction orthogonal to the bottom surface 21*b*.

Figure 5:
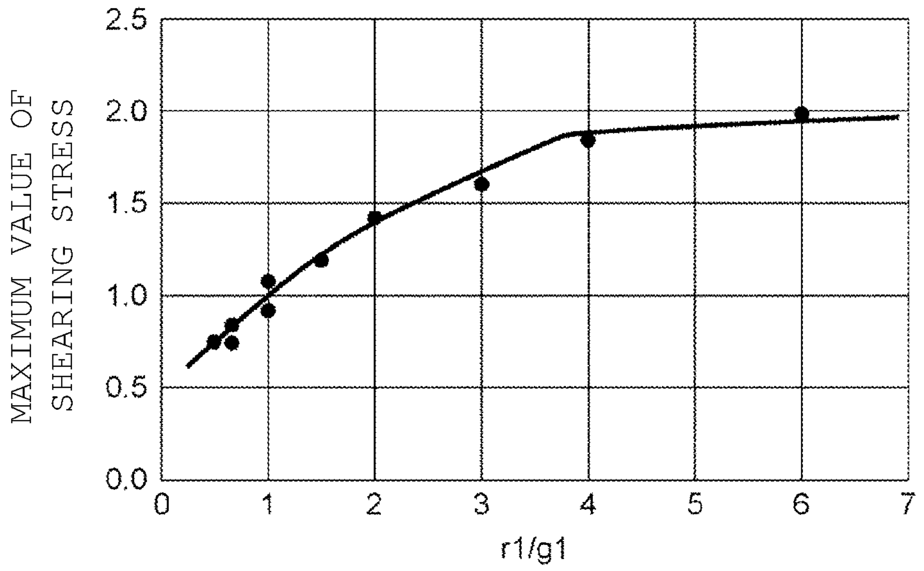
FIG. 5 is a graph illustrating a relationship between r1/g1 and a maximum value of shearing stress.

FIG. 5 is a graph illustrating the relationship between r1/g1 and the maximum value of the shearing stress. The material of the substrate 21 was a glass substrate, and the material of the first through wiring 13 was copper. The linear expansion coefficient of the glass substrate is $5.5\times10^{-7}$ [1/deg.], and the linear expansion coefficient of copper is $1.65\times10^{-5}$ [1/deg.]. The maximum value of the shearing stress applied to the substrate 21 and the first through wiring 13 was obtained by adding a temperature of 250° C. The maximum value of the shearing stress was obtained as a relative value with the shearing stress at r1/g1=1 as 1. In all the first through wirings 13, r1 is the same and g1 is the same.

As illustrated in FIG. 5, as r1/g1 was smaller than 4, the maximum value of the shearing stress decreased substantially linearly. On the other hand, when r1/g1 was larger than 4, the maximum value of the shearing stress was substantially constant. The same applies to the second through wiring 14, and the maximum value of the shearing stress decreases substantially linearly as r2/g2 becomes smaller than 4, and the maximum value of the shearing stress becomes substantially constant as r2/g2 becomes larger than 4.

Figure 6:
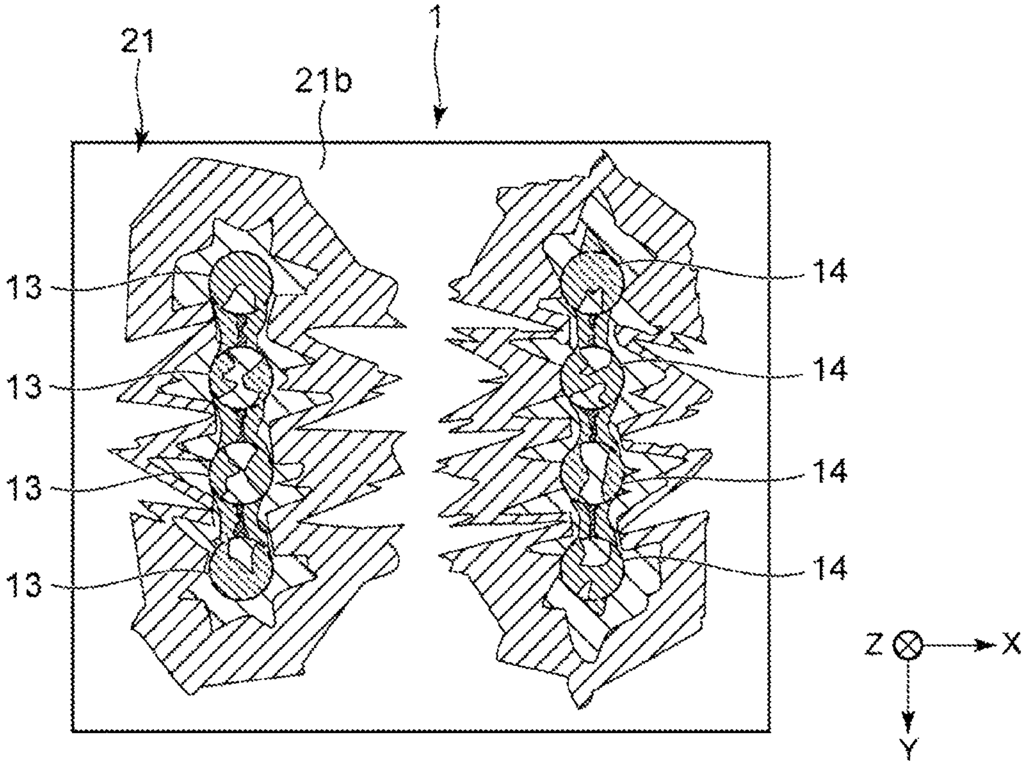
FIG. 6 is an explanatory view describing a state of shearing stress applied to the first through wiring, the second through wiring, and a substrate.

FIG. 6 is an explanatory view describing a state of shearing stress applied to the first through wiring 13 and the second through wiring 14 and the substrate 21. The magnitude of the shearing stress is indicated by shading of hatching, and the density of hatching lines is increased as the shearing stress is larger.

As illustrated in FIG. 6, the shearing stress is maximized in the substrate 21 between the two first through wirings 13 adjacent to each other in the direction of the axis AX. It is conceivable that, because the volume of a portion continuous as the substrate 21 is smaller in a portion between the first through wirings 13 adjacent to each other in the substrate 21 than in other portions in the substrate 21, the shearing stress is maximized in the portion between the first through wirings 13 adjacent to each other in the substrate 21. Similarly, the shearing stress is maximized in the substrate 21 between the two second through wirings 14 adjacent to each other in the direction of the axis AX.

From the above, by satisfying $r1/g1 \leq 4$, it is possible to secure the volume of the substrate 21 between the two first through wirings 13 adjacent to each other in the direction of the axis AX where the shearing stress is large, and by satisfying $r2/g2 \leq 4$, it is possible to secure the volume of the substrate 21 between the two second through wirings 14 adjacent to each other in the direction of the axis AX where the shearing stress is large. As described above, since the volume of the substrate 21 between the first through wirings 13 adjacent to each other and the volume of the substrate 21 between the second through wirings 14 adjacent to each other can be secured, the shearing stress can be effectively reduced, and the strength of the substrate 21 can be secured. Therefore, it is possible to secure strength against the thermal load while securing the number of windings of the coil 110 by increasing the quantities of the first and second through wirings 13 and 14.

Here, if the quantity of through wirings is simply increased to increase the number of windings of the coil, the strength of the substrate decreases. In particular, holes are provided in the substrate in order to form the through wirings in the manufacturing process, but if the number of through wirings is too large, the volume of the substrate between the through wirings is reduced. Thus, due to a difference in linear expansion coefficient between the through wirings and the substrate, a crack is generated in the substrate between the through wirings due to the thermal load, and further, there is a possibility that adjacent through wirings are short-circuited.

Therefore, in the present embodiment, as described above, focusing on the fact that the shearing stress applied to the substrate by the thermal load becomes the maximum value in the substrate between the through wirings, it has been found that the maximum value of the shearing stress decreases substantially linearly as $r1/g1$ and $r2/g2$ become equal to or less than 4, and the strength of the substrate can be secured by setting $r1/g1$ and $r2/g2$ to 4 or less. On the other hand, it has been found that when $r1/g1$ and $r2/g2$ are larger than 4, the maximum value of the shearing stress is almost saturated, and at this time, the strength of the substrate between the through wiring lines becomes very brittle.

Preferably, $r1/g1 \geq 0.5$ is satisfied, and $r2/g2 \geq 0.5$ is satisfied. Thus, the Q value is improved by reducing leakage magnetic flux passing between the first through wirings 13 and between the second through wirings 14 and reducing the coil length (the length of the coil 110 in the direction of the axis AX). In other words, by satisfying $r1/g1 \geq 0.5$, that is, $2r1 \geq g1$, the upper limit of the minimum distance g1 between the first through wirings 13 is determined according to the equivalent circle diameter 2r1 of the end surfaces of the first through wirings 13, so that it is possible to eliminate unnecessary gaps in the direction of the axis AX of the coil 110. The same applies to $r2/g2 \geq 0.5$. Preferably, g1 and g2 are 40 μm or more, and more preferably 60 μm or more.

(Method of Manufacturing Inductor Component 1)

Next, a method for manufacturing the inductor component 1 will be described with reference to FIGS. 7A to 7G. FIGS. 7A to 7G are views corresponding to an A-A section of FIG. 2.

Figure 7A:
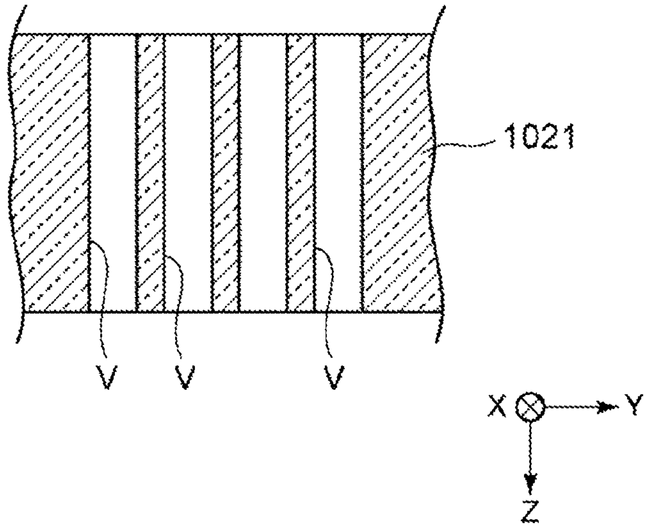
FIG. 7A is a schematic sectional view describing a method for manufacturing the inductor component.

As illustrated in FIG. 7A, a glass substrate 1021 to be the substrate 21 is prepared. The glass substrate 1021 is a single-layer glass plate. A plurality of through holes V are provided at predetermined positions of the glass substrate 1021. At this time, the glass substrate 1021 is bored by laser processing, or may be bored by dry or wet etching processing or machining such as drilling.

Figure 7B:
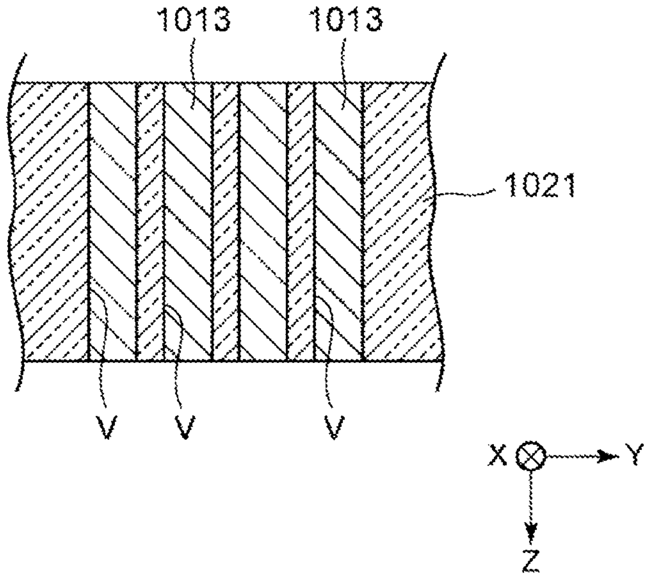
FIG. 7B is a schematic sectional view describing the method for manufacturing the inductor component.

As illustrated in FIG. 7B, a seed layer that is not illustrated is provided on the all surface of the glass substrate 1021, a copper layer is formed on the seed layer by electrolytic plating, and the seed layer and the copper layer on the all surface of the glass substrate 1021 except for the insides of the through holes V are removed by wet etching or dry etching. Thus, a through conductor layer 1013 to be the first through wirings 13 is formed in through holes V of the glass substrate 1021. At this time, although not illustrated, a through conductor layer to be the second through wirings 14 is similarly formed in the through holes V. Further, a third base layer to be a base of the third portion 121*e*3 of the first end surface portion 121*e* is formed, and a third base layer to be a base of the third portion 122*e*3 of the second end surface portion 122*e* is formed.

Figure 7C:
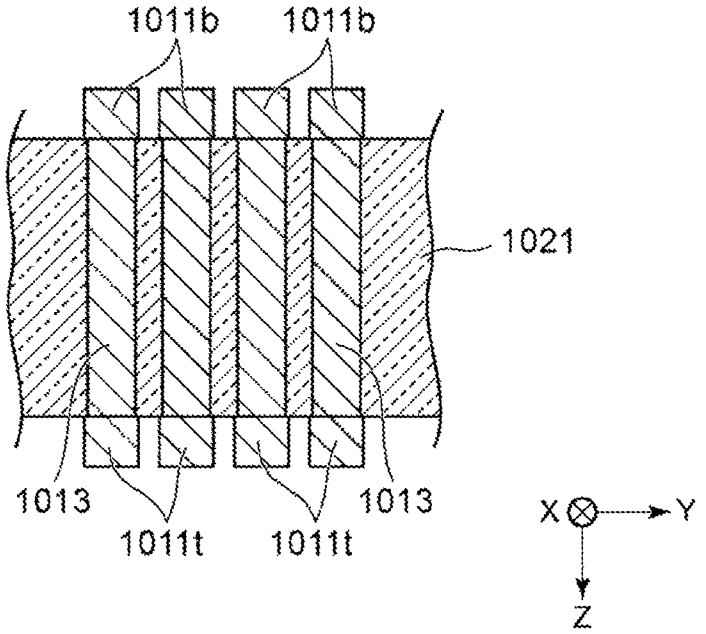
FIG. 7C is a schematic sectional view describing the method for manufacturing the inductor component.

As illustrated in FIG. 7C, a seed layer that is not illustrated is provided on the all surface of the glass substrate 1021, and a patterned photoresist is formed on the seed layer. Next, a copper layer is formed on the seed layer in a cavity of the photoresist by electrolytic plating. Thereafter, the photoresist and the seed layer are removed by wet etching or dry etching. Thus, a bottom surface conductor layer 1011*b* to be the bottom surface wiring 11*b* patterned in an arbitrary shape and a top surface conductor layer 1011*t* to be the top surface wiring 11*t* are formed. At this time, although not illustrated, a second base layer to be a base of the second portion 121*e*2 of the first end surface portion 121*e* is formed, and a second base layer to be a base of the second portion 122*e*2 of the second end surface portion 122*e* is formed.

Note that, in FIG. 7B, the bottom surface conductor layer 1011*b* and the top surface conductor layer 1011*t* may be formed without removing the copper layer. In this case, the shapes of the upper surfaces of the bottom surface conductor layer 1011*b* and the top surface conductor layer 1011*t* corresponding to the through holes V are recessed shapes.

Figure 7D:
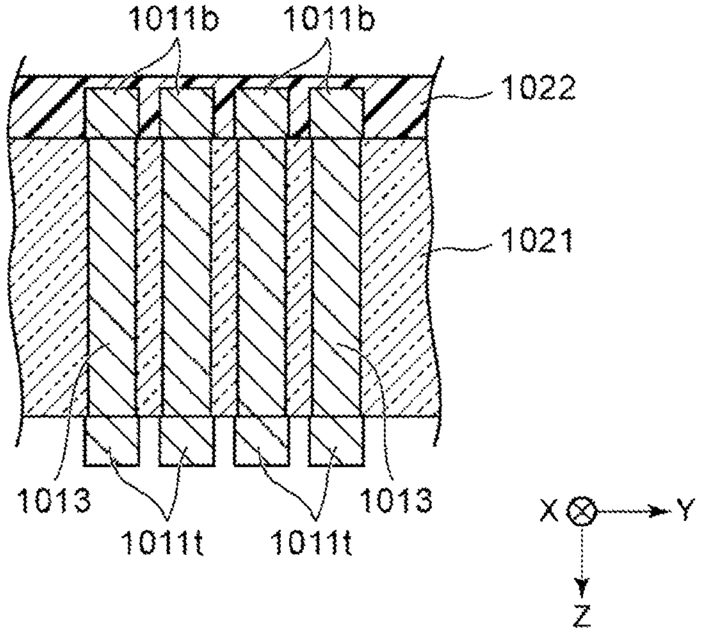
FIG. 7D is a schematic sectional view describing the method for manufacturing the inductor component.

As illustrated in FIG. 7D, an insulating resin layer 1022 to be the insulating layer 22 is applied to the glass substrate 1021 so as to cover the bottom surface conductor layer 1011*b*, and cured.

Figure 7E:
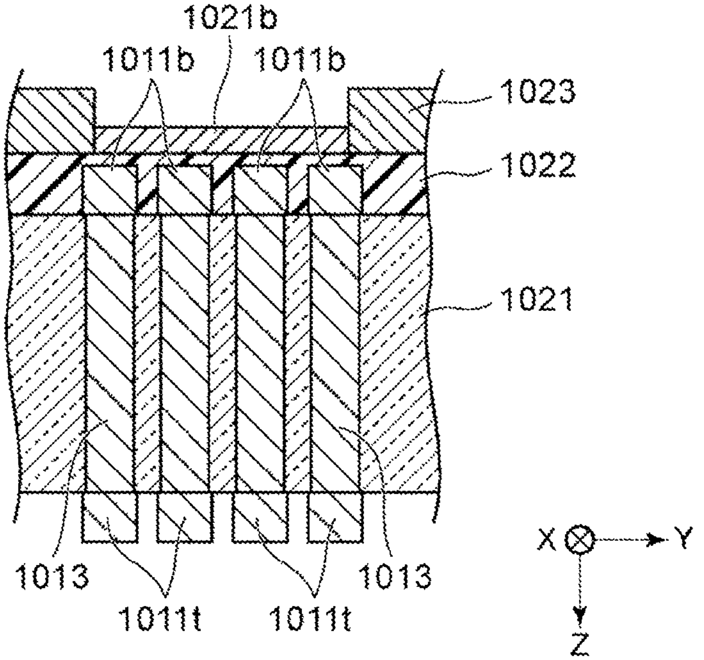
FIG. 7E is a schematic sectional view describing the method for manufacturing the inductor component.
Figure 7F:
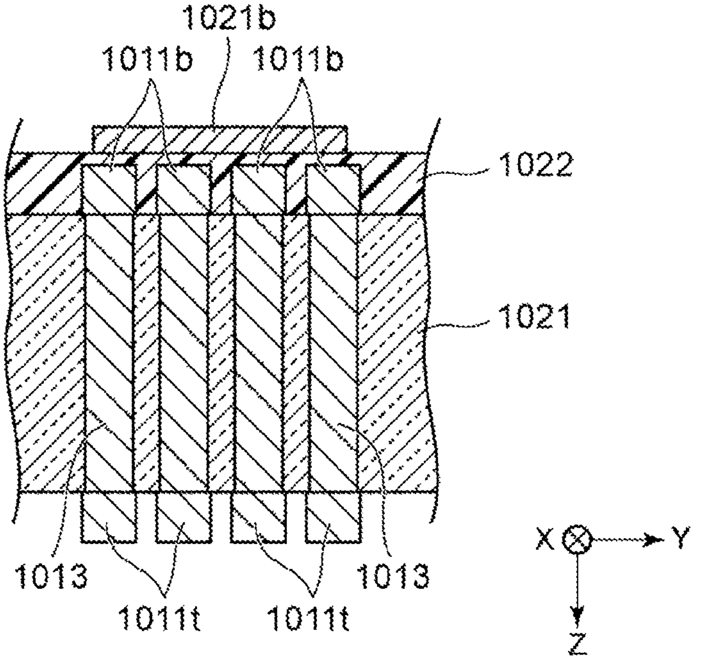
FIG. 7F is a schematic sectional view describing the method for manufacturing the inductor component.

As illustrated in FIG. 7E, a seed layer that is not illustrated is provided on the insulating resin layer 1022, and a patterned photoresist 1023 is formed on the seed layer. Next, a copper layer is formed on the seed layer in a cavity of the photoresist 1023 by electrolytic plating. Thereafter, as illustrated in FIG. 7F, the photoresist and the seed layer are removed by wet etching or dry etching. Thus, a first bottom surface base layer 1121*b* as a base of the first bottom surface portion 121*b* patterned in an arbitrary shape is formed. At this time, although not illustrated, a second bottom surface base layer as a base of the second bottom surface portion 122*b* is formed. Further, a first base layer to be a base of the first portion 121*e*1 of the first end surface portion 121*e* is formed, and a first base layer to be a base of the first portion 122*e*1 of the second end surface portion 122*e* is formed.

Figure 7G:
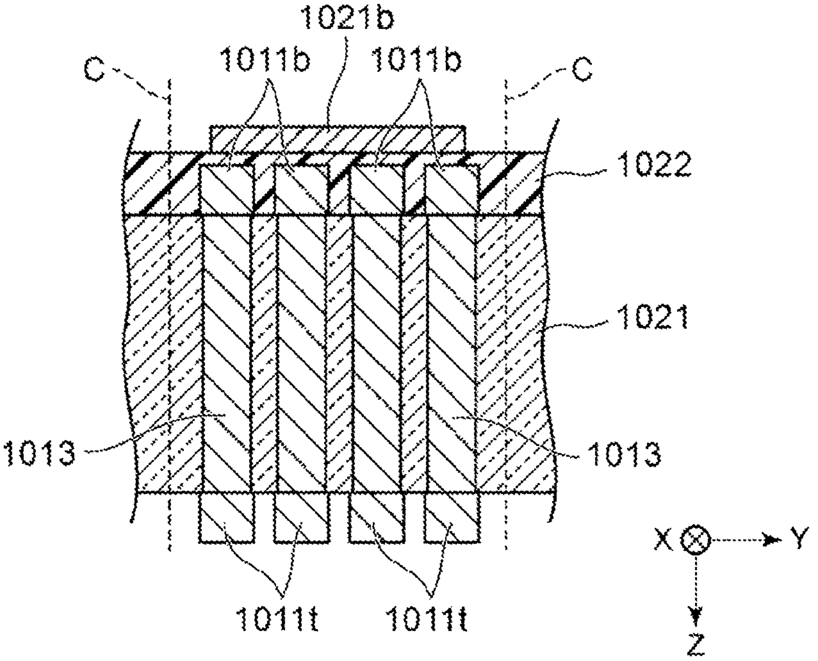
FIG. 7G is a schematic sectional view describing the method for manufacturing the inductor component.

As illustrated in FIG. 7G, the base layer is separated along a cut line C, and a plating layer is formed by barrel plating so as to cover each base layer. That is, the first external electrode 121 is formed by covering the first bottom surface base layer, and the first base layer, the second base layer, and the third base layer connected to the first bottom surface base layer with the plating layer. Further, the second external electrode 122 is formed by covering the second bottom surface base layer and the first base layer, the second base layer, and the third base layer connected to the second bottom surface base layer with the plating layer. Thus, the inductor component 1 is manufactured.

The plating layer includes, for example, two layers of Ni/Sn. Note that the plating layer may include a plurality of layers of Cu/Ni/Au, Cu/Ni/Pd/Au, or the like, for example. Further, as the external electrode, only a base layer may be provided without providing a plating layer, and it is sufficient if an optimum material is appropriately selected from rust prevention, solder wettability, electromigration resistance, and the like.

Note that in the above manufacturing method, the copper layer is removed by wet etching or dry etching, but CMP processing or machining may be used in the removal of the copper layer. Further, when the through conductor layer to be the through wirings is formed in the through holes V, all of the through conductor layer is formed by plating, but a gap portion may be filled with a conductive resin after a part thereof is plated.

Further, in the above manufacturing method, a glass substrate is used as the element body, but a sintered material may be used as the element body. In this case, an inductor wiring of one turn or less is formed by printing with a conductive paste. Here, as the conductive paste, a material having good conductivity such as Ag or Cu is selected.

Next, an insulating paste of glass, ferrite, or the like is printed, and this process is repeated. By forming a cavity that opens in a connection portion of the inductor wiring in the insulating paste and filling the cavity with the conductive paste, the connection portion of the inductor wiring between the layers can be electrically connected.

Thereafter, the insulating paste is sintered by heat treatment at a high temperature, and then separation is performed to form an external terminal, thereby manufacturing an inductor component. When an insulating paste having high insulation properties, such as glass, is used as the insulating paste, an inductor component having high Q at high frequencies can be obtained. When ferrite is used for the insulating paste, an inductor component having high inductance can be obtained.

3. Modification Example

Figure 8:
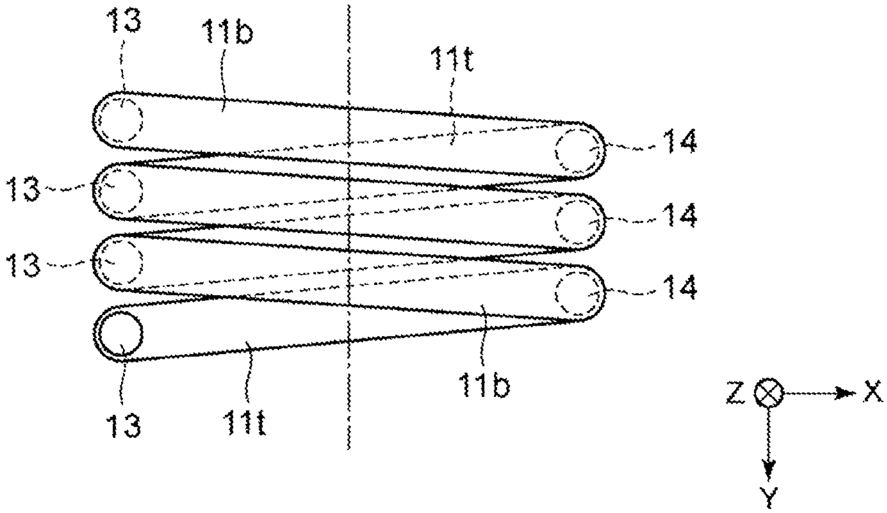
FIG. 8 is a schematic bottom view illustrating a modification example of the inductor component as viewed from the bottom surface side.

FIG. 8 is a schematic bottom view illustrating a modification example of the inductor component as viewed from the bottom surface 100*b* (bottom surface 21*b*) side.

As illustrated in FIG. 8, the difference between the quantity of first through wirings 13 and the quantity of second through wirings 14 is 1, and the first through wirings 13 and the second through wirings 14 are alternately arranged with respect to the axis AX along the axis AX of the coil 110 as viewed from the direction orthogonal to the bottom surface 21*b*. In this embodiment, the quantity of first through wirings 13 is four, and the quantity of second through wirings 14 is three.

In other words, with respect to the position in the direction of the axis AX, the second through wiring 14 is positioned between the first through wirings 13 adjacent to each other, and the first through wiring 13 is positioned between the second through wirings 14 adjacent to each other. That is, the first through wirings 13 and the second through wirings 14 are arranged in a staggered manner along the direction of the axis AX.

According to the above configuration, in a case where the quantity difference between the first through wirings 13 and the second through wirings 14 is 1, the size of the coil 110 in the direction of the axis AX can be reduced as compared with a case where these are line-symmetric with respect to the axis AX of the coil 110, and the inductor component 1 can be downsized.

Second Embodiment

Figure 9:
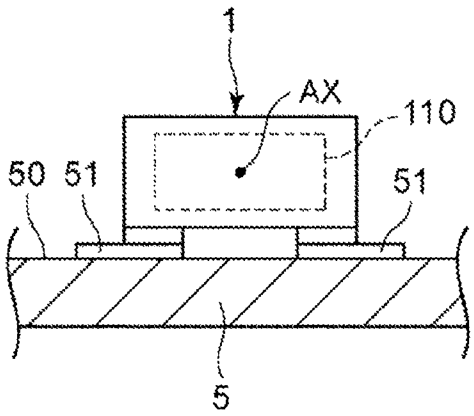
FIG. 9 is a schematic view illustrating a mounting structure of the inductor component.

FIG. 9 is a schematic view illustrating a mounting structure of the inductor component. As illustrated in FIG. 9, the mounting structure of the inductor component includes a mounting substrate 5 and the inductor component 1 of the first embodiment mounted on a mounting surface 50 of the mounting substrate 5. The mounting substrate 5 has a wiring portion 51 on the mounting surface 50. The wiring portion 51 is, for example, a conductive wiring such as a printed wiring, and also includes a land pattern that electrically and physically connects a mounting component such as an inductor component. The axis AX of the coil 110 is parallel to the mounting surface 50. Note that, although not illustrated in FIG. 9, the surface of a portion of the mounting substrate 5 where the wiring portion 51 does not exist may be subjected to an insulation process using a solder resist or the like.

According to the above configuration, since the axis AX of the coil 110 is parallel to the mounting surface 50, magnetic flux of the inductor component 1 is not affected by the wiring portion 51 of the mounting substrate 5, and a decrease in the acquisition efficiency of inductance can be suppressed.

Figure 10:
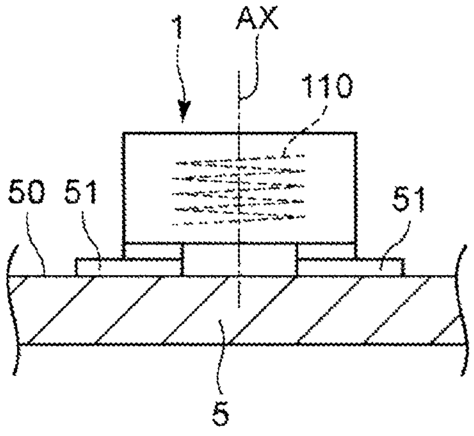
FIG. 10 is a schematic view illustrating a modification example of the mounting structure of the inductor component.

FIG. 10 is a schematic view illustrating a modification example of the mounting structure of the inductor component. As illustrated in FIG. 10, the mounting structure of the inductor component includes the mounting substrate 5 and the inductor component 1 of the first embodiment mounted on the mounting surface 50 of the mounting substrate 5. The axis AX of the coil 110 is orthogonal to the mounting surface 50.

According to the above configuration, since the axis AX of the coil 110 is orthogonal to the mounting surface 50, the magnetic flux of the inductor component 1 does not affect other inductor components 1 adjacent to the inductor component 1, and the degree of freedom of the mounting layout is improved.

Preferably, the axis AX of the coil 110 does not overlap with the wiring portion 51. Accordingly, it is possible to suppress the magnetic flux of the inductor component 1 from being hindered by the wiring portion 51, and it is possible to suppress a decrease in the acquisition efficiency of inductance.

Note that, in FIGS. 9 and 10, the inductor component may be disposed on the mounting surface such that a direction of a shortest dimension among the length, the width, and the height of the element body is orthogonal to the mounting surface. Accordingly, the direction of the shortest dimension among the length, the width, and the height of the element body is a thickness direction in a state of being disposed on the mounting surface, and the thickness of the inductor component can be reduced.

Further, in FIGS. 9 and 10, the inductor component may be disposed on the mounting surface such that the direction of the longest dimension among the length, the width, and the height of the element body is orthogonal to the mounting surface. Accordingly, the direction of the shorter dimension among the length, the width, and the height of the element body determines the mounting surface of the inductor component, and the mounting area of the inductor component can be reduced.

Note that the present disclosure is not limited to the above-described embodiments, and can be modified in design without departing from the gist of the present disclosure. For example, respective feature points of the first and second embodiments may be variously combined.

What is claimed is:

1. An inductor component comprising:

an element body having a length, a width, and a height;

a coil on the element body, having a spiral shape and wound along an axis; and a first external electrode and a second external electrode on the element body and electrically connected to the coil, wherein the element body includes a substrate having a first main surface and a second main surface opposite to each other, the axis of the coil is disposed in parallel to a direction of a shorter dimension among the length, the width, and the height of the element body, the coil includes a plurality of first coil wirings on the first main surface, a plurality of second coil wirings on the second main surface, a plurality of first through wirings which penetrate the substrate from the first main surface to the second main surface and arranged along the axis, and a plurality of second through wirings which penetrate the substrate from the first main surface to the second main surface, are disposed on an opposite side of the first through wirings with respect to the axis, and are arranged along the axis, the first coil wirings, the first through wirings, the second coil wirings, and the second through wirings are connected in this order to constitute at least a part of the spiral shape, two of the first through wirings adjacent to each other in a direction of the axis on the first main surface satisfy the relationship $r1/g1 \leq 4$, where r1 is a radius of an equivalent circle diameter of an end surface of each of the first through wirings and g1 is a minimum distance between end surfaces of the two first through wirings, and two of the second through wirings adjacent to each other in the direction of the axis on the first main surface satisfy the relationship $r2/g2 \leq 4$, where r2 is a radius of an equivalent circle diameter of an end surface of each of the second through wirings and g2 is a minimum distance between end surfaces of the two second through wirings, and wherein at least one of:

a length of the first through wiring in an extending direction is equal to or more than five times the equivalent circle diameter of an end surface of the first through wiring on the first main surface, or a length of the second through wiring in the extending direction is equal to or more than five times the equivalent circle diameter of an end surface of the second through wiring on the first main surface.

2. The inductor component according to claim 1, wherein the element body includes an insulating layer covering at least the first coil wirings on the first main surface or the second coil wirings on the second main surface.

3. The inductor component according to claim 1, wherein the first through wirings and the second through wirings extend in a direction orthogonal to the first main surface.

4. The inductor component according to claim 1, wherein the axis of the coil is set to correspond to a direction of a shortest dimension among the length, the width, and the height of the element body.

5. The inductor component according to claim 1, wherein in the first main surface, a line connecting centroids of end surfaces of the plurality of first through wirings is parallel to the axis of the coil, and a line connecting centroids of end surfaces of the plurality of second through wirings is parallel to the axis of the coil.

6. The inductor component according to claim 1, wherein the first coil wirings extend only in one direction.

7. The inductor component according to claim 1, wherein the second coil wirings extend only in one direction.

8. The inductor component according to claim 1, wherein as viewed from the direction orthogonal to the first main surface, a first end portion of each of the first coil wirings and a first end portion of each of the second coil wirings overlap each other, and an angle defined by the first coil wiring and the second coil wiring is from 5 degrees to 45 degrees.

9. The inductor component according to claim 1, wherein at least the first through wirings or the second through wirings include a plurality of conductor layers.

10. The inductor component according to claim 1, wherein a quantity of the first through wirings and a quantity of the second through wirings are same, and the first through wirings and the second through wirings are line-symmetric with respect to the axis of the coil as viewed from the direction orthogonal to the first main surface.

11. The inductor component according to claim 1, wherein a difference between a quantity of the first through wirings and a quantity of the second through wirings is 1, and the first through wirings and the second through wirings are alternately arranged with respect to the axis along the direction of the axis of the coil as viewed from the direction orthogonal to the first main surface.

12. The inductor component according to claim 1, wherein a volume of the inductor component is equal to or less than 0.08 $mm^3$, and a size of a long side of the inductor component is equal to or less than 0.65 mm.

13. The inductor component according to claim 1, wherein the length of the first through wiring in the extending direction is equal to or more than five times the equivalent circle diameter of the end surface of the first through wiring on the first main surface, and the length of the second through wiring in the extending direction is equal to or more than five times the equivalent circle diameter of the end surface of the second through wiring on the first main surface.

14. A mounting structure of an inductor component, the mounting structure comprising:

a mounting substrate; and the inductor component according to claim 1 mounted on a mounting surface of the mounting substrate, the axis of the coil being parallel to the mounting surface.

15. The mounting structure of the inductor component according to claim 14, wherein the inductor component is disposed on the mounting surface in such a manner that a direction of a shortest dimension among the length, the width, and the height of the element body is orthogonal to the mounting surface.

16. The mounting structure of the inductor component according to claim 14, wherein the inductor component is disposed on the mounting surface in such a manner that a direction of a longest dimension among the length, the width, and the height of the element body is orthogonal to the mounting surface.

17. A mounting structure of an inductor component, the mounting structure comprising:

a mounting substrate;

the inductor component according to claim 1 mounted on a mounting surface of the mounting substrate, the axis of the coil being orthogonal to the mounting surface.

18. The mounting structure of the inductor component according to claim 17, wherein the mounting substrate has a wiring portion on the mounting surface, and the axis of the coil does not overlap the wiring portion.

19. The inductor component according to claim 1, wherein at least one of:

the first external electrode includes a first end surface portion having a first portion, a second portion, and a third portion sequentially connected along a height direction from a bottom surface of the element body toward a top surface of the element body, the first portion of the first end surface portion being connected to a first bottom surface portion at the bottom surface, the second portion of the first end surface portion being connected to the first through wiring in the element body, and the third portion of the first end surface portion being exposed from the substrate; or the second external electrode includes a second end surface portion having a first portion, a second portion, and a third portion sequentially connected along the height direction, the first portion of the second end surface portion being connected to a second bottom surface portion at the bottom surface, the second portion of the second end surface portion being connected to the second through wiring in the element body, and the third portion of the second end surface portion being exposed from the substrate.

20. An inductor component comprising:

an element body having a length, a width, and a height;

a coil on the element body, having a spiral shape and wound along an axis; and a first external electrode and a second external electrode on the element body and electrically connected to the coil, wherein the element body includes a substrate having a first main surface and a second main surface opposite to each other, the axis of the coil is disposed in parallel to a direction of a shorter dimension among the length, the width, and the height of the element body, the coil includes a plurality of first coil wirings on the first main surface, a plurality of second coil wirings on the second main surface, a plurality of first through wirings which penetrate the substrate from the first main surface to the second main surface and arranged along the axis, and a plurality of second through wirings which penetrate the substrate from the first main surface to the second main surface, are disposed on an opposite side of the first through wirings with respect to the axis, and are arranged along the axis, the first coil wirings, the first through wirings, the second coil wirings, and the second through wirings are connected in this order to constitute at least a part of the spiral shape, two of the first through wirings adjacent to each other in a direction of the axis on the first main surface satisfy the relationship $r1/g1 \leq 4$, where r1 is a radius of an equivalent circle diameter of an end surface of each of the first through wirings and g1 is a minimum distance between end surfaces of the two first through wirings, and two of the second through wirings adjacent to each other in the direction of the axis on the first main surface satisfy the relationship $r2/g2 \leq 4$, where r2 is a radius of an equivalent circle diameter of an end surface of each of the second through wirings and g2 is a minimum distance between end surfaces of the two second through wirings, and wherein at least one of:

the first external electrode includes a first end surface portion having a first portion, a second portion, and a third portion sequentially connected along a height direction from a bottom surface of the element body toward a top surface of the element body, the first portion of the first end surface portion being connected to a first bottom surface portion at the bottom surface, the second portion of the first end surface portion being connected to the first through wiring in the element body, and the third portion of the first end surface portion being exposed from the substrate; or the second external electrode includes a second end surface portion having a first portion, a second portion, and a third portion sequentially connected along the height direction, the first portion of the second end surface portion being connected to a second bottom surface portion at the bottom surface, the second portion of the second end surface portion being connected to the second through wiring in the element body, and the third portion of the second end surface portion being exposed from the substrate.

* * * * *